Patented Feb. 25, 1941

2,233,296

UNITED STATES PATENT OFFICE 2,233,296

PROCESS OF MAKING MONO ACYL ALKYLENE DIAMINES

Johannes Nelles, Leverkusen-Schlebusch, Ernst Tietze, Bonn, and Otto Bayer, Leverkusen-I. G. Werk, Germany, assignors, by mesne assignments, to General Aniline & Film Corporation, New York, N. Y., a corporation of Delaware No Drawing. Application April 22, 1939, Serial No. 269,420. In Germany April 28, 1938

4 Claims. (Cl. 260—556)

The present invention relates to a process of preparing acid amides and to certain new products obtainable thereby.

It has been found that basic acid amides can be prepared in a very simple and economical manner by causing ethylene imides and/or propylene imides of organic sulfonic or carboxylic acids to react with primary or secondary amino compounds. The reaction probably takes place according to the following general formula:

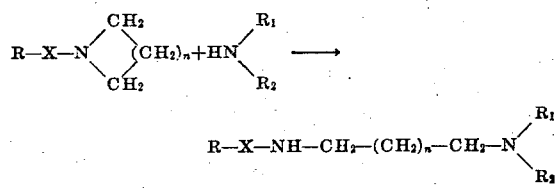

in which X represents the group —SO$_2$— or —CO—, R is an organic radical and R$_1$ and R$_2$ are hydrogen or also organic radicals and $n$ is the number 0 or 1. The hydrogen atoms of the ethylene or propylene bridge of the imide may be replaced by substituents such as, for instance, methyl groups. It is seen therefrom that the products of the reaction are monoacylated derivatives of ethylenediamine and propylenediamine. Such products which are partly new, are of great interest as such, for instance in the textile and rubber industry, or as intermediates for the preparation of other valuable compounds, for example dyestuffs and pharmaceuticals.

Ethylene imides and propylene imides of organic acids which are used as starting material for the present invention are obtainable, for instance, according to the processes described in "Berichte der Berliner Chemischen Gesellschaft," volume 28, page 2933 and volume 32, pages 2035 and 2037, by causing organic acid halides to react with ethylene imine, substituted 1.2-ethylene imines or the corresponding propylene imines. For the process of this invention there may be employed, for instance, the ethylene imides and propylene imides respectively of methane sulfonic acid, chloroethane sulfonic acid, sulfonic acids obtainable by chlorination of aliphatic or cycloaliphatic hydrocarbons in the presence of sulfur dioxide, benzene sulfonic acid, benzene disulfonic acids, chlorobenzene sulfonic acid, nitrobenzene sulfonic acid, p-acetylaminobenzene sulfonic acid, sulfosalicylic acid, naphthalenesulfonic acid, polychloro-naphthalenesulfonic acids, oxynaphthalenesulfonic acids, naphthalenedisulfonic acids, quinolinesulfonic acids and so on.

As carboxylic acids, the imides of which, as far as they can be prepared, are employed for the process of the present invention there may be mentioned, for instance, acetic acid, chloro-acetic acid, stearic acid, crotonic acid, benzoic acid, alkyl benzoic acids, phthalic acid and so on. Instead of the simple imides also the substituted imides, for instance, C-methylethylene imides may be employed.

As suitable primary and secondary amines we may mention, for example, aliphatic monoamines, di- or polyamines, aromatic amines, aliphatic aromatic amines, halogenated amines, oxyamines etc. More specifically, there may be employed, for instance, methylamine, diethylamine, isooctylamine, stearylamine, distearylamine, ethylene diamine, diethylenetriamine, polyethylenepolyamines obtainable by the reaction of ethylenedichloride with ammonia, polyethyleneimines, chloroethylamine, aminoacetic acid, methyltaurine, ethanolamine, diethanolamine, dicyandiamide, guanidine, piperidine, tetrahydroquinoline, aniline, ethylaniline, hydroxyethylaniline, chloroaniline, nitroaniline, anthranilic acid ester, p-aminobenzenesulfoamide, naphthylamine, morpholine, benzylamine, dehydrothiotoluidine, 2-amino - 5 - diethylamino-n-pentane. Also mixtures of such amino compounds may be employed.

The reaction of the amino compounds with the imides may be carried out in the absence or presence of solvents or diluents, like for instance water, carbontetrachloride, benzene, benzine and the like. In most cases the reaction is accompanied by a considerable rise in temperature. It is necessary, therefore, in many cases to cool the reaction mixture or to add the reaction components by and by. In some cases the mixture must be warmed at the end in order to complete the reaction. The reaction may also be carried out at elevated pressure, for instance if gaseous amines are used like ammonia and methyl amine. It has been found that the ethylene imides of sulfonic acids react most easily. When working with carboxylic acid ethylene imides or with propylene imides it is necessary, therefore, in most cases to carry out the reaction at elevated temperature and, if desired, elevated pressure. The reaction may also be carried out in the presence of other substances or of suitable substrates, for instance, in or on fibers or similar material of cellulose or cellulose derivatives.

Our invention is furthermore illustrated by the following examples without being limited thereto, the parts being by weight:

Example 1

10.1 parts of 3,4-dichlorobenzene-1-sulfonic acid ethylene imide (melting point 93–94°; prepared by reacting dichlorobenzene sulfonic acid chloride with ethylene imine as described in Berichte vol 32, page 2037) are dissolved in 10 parts of benzene. Thereupon a solution of 3.5 parts of n-butylamine in 10 parts of benzene is poured thereto within 10 minutes, care being taken by suitable cooling that the temperature does not surpass 60°. After 15 hours, water and ether are added to the reaction mixture and the condensation product is extracted by means of dilute sodium carbonate solution. The aqueous solution is then brought to a pH-value of about 8–8.5 by addition of sodium bicarbonate, whereby the condensation product is separated in form of an oil. The oil is dissolved in ether. The ether solution is then dried over sodium sulfate and the ether thereafter evaporated. 9.6 parts of a viscous, yellowish oil are thus obtained which probably represents the N-dichlorobenzene sulfonyl-N'-butyl ethylene diamine.

Example 2

10.1 parts of 3,4-dichlorobenzene-1-sulfonic acid ethylene imide are dissolved in 20 parts of benzene and added to a solution of 3.5 parts of diethyl amine in 10 parts of benzene. The temperature rises to about 60° C. The reaction product is purified by shaking its solution in benzine with dilute caustic soda lye. Thereupon the product is precipitated at a pH of 10 by adding sodium bicarbonate, and is again dissolved in ether. Upon working up as usual, 8.5 parts of an oil are obtained which soon solidifies, melts at 36° C. and has the probable constitution N-dichloro benzene sulfonyl-N'-diethyl ethylene diamine. The hydrochloride of the compound, when crystallized from ethyl alcohol, melts at 167–168° C.

Example 3

5.04 parts 3,4-dichlorobenzene-1-sulfonic acid ethylene imide are dissolved in 12 parts chlorobenzene and mixed with 2 parts aniline. The clear solution warms slightly; after 36 hours crystals have formed in large quantity. They are filtered off, washed with benzine and crystallized from a benzene-benzine mixture. There are obtained 4.5 parts of a product melting at 101–102° C, which probably is the N-dichloro benzene sulfonyl-N'-phenyl ethylene diamine.

Example 4

5.04 parts 3,4-dichlorobenzene-1-sulfonic acid ethylene imide dissolved in 12 parts chlorobenzene are heated to 50–60° C. for 24 hours with 3.3 parts 4-amino benzoic acid methyl ester. The product is purified by extracting its ether solution with sold dilute caustic soda lye and adding sodium bicarbonate until a pH of 9 is reached. The product which is at first oily, soon crystallizes. After recrystallizing from a benzene-benzine mixture it has a melting point of 121–122° C. The probable formula is

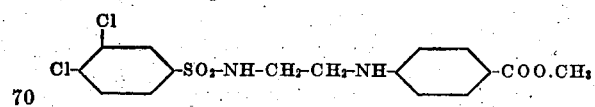

Example 5

5.04 parts 3,4-dichlorobenzene-1-sulfonic acid ethylene imide dissolved in 10 parts benzene are warmed with 3.1 parts 4-chloro-2-amino-1-methyl benzene for 24 hours to 60° C. On cooling, the reaction product separates in the form of crystals which are filtered off. After recrystallizing from a benzene-benzine mixture, 5.2 parts of a product melting at 130–132° C. and having the probable formula: N-dichlorobenzene sulfonyl N'-(2-chloro-5-methyl phenyl)-ethylene diamine are obtained.

Example 6

If, in the process of Example 5, 3.2 parts β-naphthylamine are used instead of the chloro amino methyl benzene and the mixture is warmed to 50–60° C. for three days, a reaction product is obtained having the probable formula

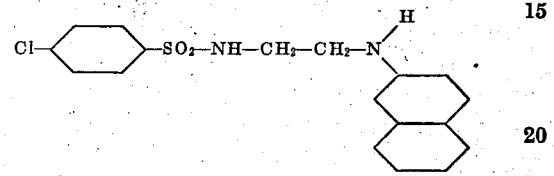

which, when crystallized from methyl alcohol, melts at 96–98° C.

Example 7

5.04 parts 3,4-dichloro-1-sulfonic acid ethylene imide are dissolved in 10 parts ethanol amine. The mixture warms to about 60° C. The clear viscous solution is kept at this temperature on the water bath for 1 hour, whereupon a sample is clearly soluble in dilute caustic soda lye, such solution yielding a precipitate with sodium bicarbonate. The reaction mixture is worked up by extracting with caustic soda lye, precipitating with sodium bicarbonate at a pH of 9 and dissolving in ether. A viscous, yellowish resin is obtained which is very easily soluble in methyl alcohol.

Example 8

5.5 parts benzene sulfonic acid ethylene imide (melting point: 47–48°) dissolved in 10 parts benzene are mixed with a solution of 3 parts piperidine in 10 parts benzene. The temperature rises to about 40° C. while the reaction proceeds. After isolation and recrystallization from benzene-benzine mixtures, white crystals having a melting point of 42–43° C. and constituting a product of the probable formula

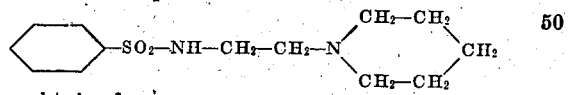

are obtained.

By replacing the above-mentioned benzene sulfonic acid ethylene imide by the dichlorobenzene sulfonic acid ethylene imide of Example 1, a corresponding product melting at 117–118° C. is obtained.

Example 9

18.3 gs. benzene sulfonic acid ethylene imide dissolved in 20 ccms. benzene are added to a solution of 26.9 gs. stearyl amine in 50 ccms. benzene. The temperature rises slightly. The mixture is left standing for 12 hours at room temperature, warmed on the water bath for another hour and freed from the solvent by distillation. The residue is a wax-like product being soluble in dilute acetic acid and having the probable constitution N-benzene-sulfonyl-N'-stearyl-ethylene diamine.

Example 10

To a solution of 43 gs. polymerized ethylene imine in 200 ccms. chloroform which boils under reflux, there is added a solution of 93 gs. benzene sulfonic acid ethylene imide in 100 ccms. chloroform. The mixture is boiled under reflux for 2 hours. Thereupon the solvent is distilled off, at the end under reduced pressure, the residue is dissolved in dilute caustic soda lye and the solution filtered. By pouring the caustic soda solution into an aqueous sodium bicarbonate solution, the reaction product is precipitated in the form of a resinous mass.

The reaction can be carried out in a similar manner in an aqueous medium and/or with different relative proportions of the reactants.

Instead of polymerized ethylene imine, there may also be used polyalkylene polyamines as are obtainable by condensing ethylene dichloride with ammonia.

*Example 11*

5.8 parts m-benzene disulfonic acid diethylene imide (melting point: 98–99°), obtainable by reacting m-benzene disulfonic acid chloride with ethylene imine according to Ber. 32, page 2037, are dissolved in 50 parts benzene and mixed with a solution of 3.5 parts diethyl amine in 25 parts benzene. After 12 hours, the solvent is distilled off. The remaining reaction product is a viscous oil which dissolves in dilute acids and dilute caustic soda lye.

*Example 12*

25 parts diethylamine are quickly dropped into a suspension of 28 parts of the acid potassium salt of the ethylene sulfimide of 5-sulfo-salicylic acid in 25 parts water. The mixture warms considerably; the condensation is completed when a sample is clearly soluble in dilute acetic or hydrochloric acid (after about three hours). In order to purify the product, a slight excess of caustic soda lye is added and the unreacted diethyl amine is distilled off in vacuo. The colorless clear residue is acidified by adding dilute hydrochloric acid; after a short time, the colorless hydrochloride of the formula

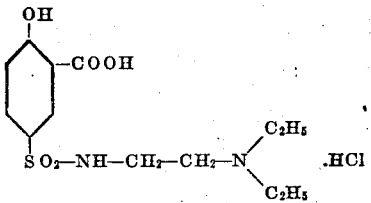

crystallizes. Separation of the hydrochloride may be facilitated by adding sodium chloride.

If instead of diethyl amine an equal amount of n-butyl amine is used, a compound of the formula

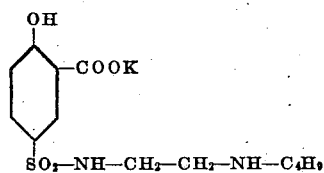

is formed which can be precipitated by means of potassium carbonate at a pH of 9–10 in the form of a sirupy soap.

*Example 13*

50 parts aniline are added to a suspension of 56 parts of the acid potassium salt of the ethylene imide of 5-sulfo-salicylic acid in 30 parts water. While the temperature rises to 50–60°, condensation takes place. After three hours the mixture is poured into an excess dilute hydrochloric acid. The precipitated oily product, which soon solidifies, is separated. It is purified by dissolving in dilute caustic soda lye and acidifying the solution with dilute formic acid. 42 parts of a compound of the probable formula:

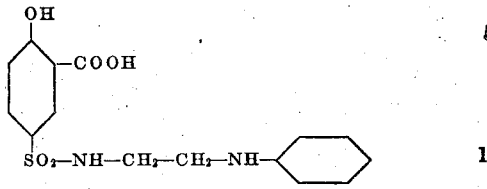

having a melting point of 197–198° C. are obtained.

*Example 14*

56 parts of the acid potassium salt of the ethylene imide of 5-sulfo-salicylic acid are quickly added at 30° C. to a suspension of 34 parts 4-amino acetanilide in 400 parts water to which 5 parts soda have been added. The pappy mass changes into a clear solution during ½ hour. It is thereupon heated for 2 hours to 40–50° C. The condensation product is salted out by adding sodium chloride at a pH of from 8–9. For further purification, the crude product is dissolved in water while adding sodium bicarbonate. From this solution, the sodium salt of a condensation product is salted out by adding 20% sodium chloride. A white crystal powder of the condensation product of the probable formula

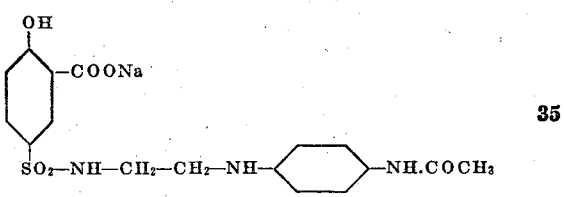

is obtained.

By using, instead of the 4-amino acetanilide, the 3-amino acetanilide, a similar condensation product is obtained which can be isolated in the form of its potassium salt by adding potassium chloride to the clear reaction mixture at a pH of 9–10. The product has the probable formula:

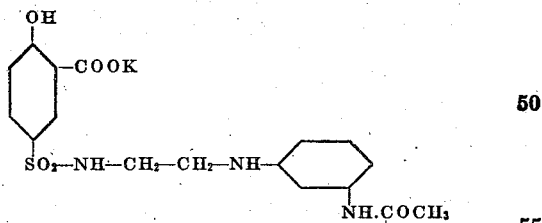

*Example 15*

By warming to 40–50° for 2 days, while frequently stirring a mixture of 56 parts of the acid potassium salt of the ethylene imide of 5-sulfo salicylic acid, 50 parts freshly distilled N-monomethyl aniline, 50 parts water and 30 parts dioxane, a condensation product of the probable formula is obtained·

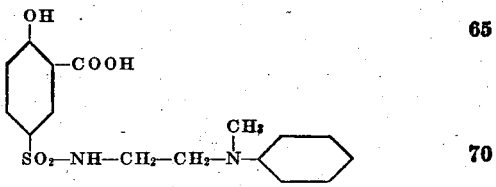

The product is preferably isolated in the form of its hydrochloride by pouring the reaction mixture into dilute hydrochloric acid and salting out by adding 20% sodium chloride. The hydrochloride is a white crystalline powder which is rather difficultly soluble in water.

*Example 16*

100 parts dodecyl sulfonic acid ethylene imide are warmed with 45 parts diethanol amine for 2 hours to 150° C. A clear melt is obtained which on cooling solidifies to a pasty mass. It is soluble in dilute acetic acid.

*Example 17*

By replacing, in Example 9, the stearyl amine by the corresponding molecular quantity of N-methyl octadecyl amine, the N-methyl derivative of the probable formula:

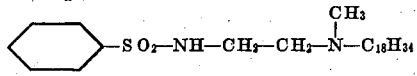

is obtained. It is a wax-like mass which solidifies at 32–34° C.

*Example 18*

By causing to react 54 parts 2.5-dichloro sulfanilethylene imide (melting point: 160–161° C.), dissolved in benzene, with 16 parts diethyl amine similarly as described in the foregoing examples, a product of the melting point of 97–98° C. having the probable formula is obtained in very good yield:

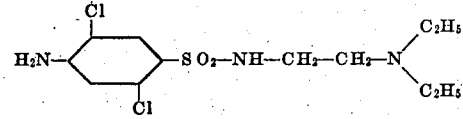

When using, instead of diethyl amine, an equal amount of n-butyl amine, the corresponding n-butyl compound is obtained which melts at 71–72° C. The yield is 70–80% of the theoretical.

*Example 19*

55 parts benzene sulfonic acid ethylene imide dissolved in 100 parts benzene are caused to react with 90 parts of a 25% aqueous solution of methyl amine at 20° C. while well stirring. When the reaction is completed, methyl amine, water and benzene are distilled off in vacuo. The resulting product is a viscous oil and has the probable formula:

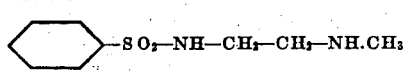

The oil is well soluble in caustic soda lye and mineral acids; it is precipitated from its solution by adding sodium bicarbonate.

*Example 20*

By causing to react a solution of 366 parts benzene sulfonic acid ethylene imide with 93 parts β,β'-dimethylethylene diamine (boiling point 117–119° C.), dissolved in 100 parts benzene for 2 hours at 20° C., while well cooling and stirring, the compound of the probable formula

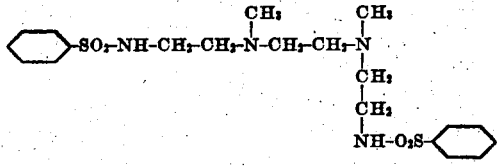

is obtained in nearly quantitative yield. It represents a highly viscous nearly colorless resin which becomes easily flowable at 60° C. It is easily soluble in acid and caustic soda lye and is precipitated from its solutions by adding sodium bicarbonate.

*Example 21*

By causing to react 18.6 parts aniline, as such or in benzene solution, on 33.8 parts naphthalene 1,5-disulfo-ethylene imide (obtainable by condensing naphthalene 1,5-disulfochloride of the melting point of 184° C. with two molecular quantities ethylene imine), an alkali soluble compound of the probable formula

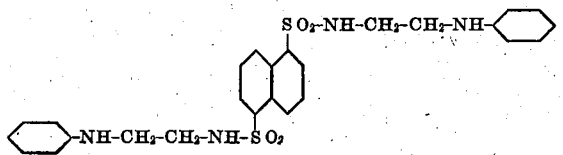

is obtained. The product is nearly colorless and has a high melting point.

When using, instead of aniline, an equimolecular quantity of benzidine and carrying out the reaction in chlorobenzene, a high molecular difficulty soluble condensation product is obtained at 60–70° C. in nearly quantitative yield.

*Example 22*

28.6 parts benzoic acid ethylene imide are warmed with 16 parts n-butyl amine to 80–90° C. for 10 hours. The mixture is thereupon distilled. After small quantities of unreacted starting material are distilled over, a fraction boiling between 150–160° C. at 0.5 mm. Hg. is obtained which mainly represents N-benzoyl-N'-n-butyl ethylene diamine.

*Example 23*

21.5 parts polymerized ethylene imine are dissolved in 50 parts chloroform. On the addition of a solution of 24 parts benzoic acid ethylene imide in 25 parts chloroform, the mixture is refluxed for some hours. After distilling off the solvent, the reaction product is obtained in the form of a yellow to brown tough mass which is insoluble in water but is soluble in dilute mineral acids.

*Example 24*

100 parts stearoyl ethylene imide (obtained from stearoyl chloride and ethylene imine) are mixed with 40 parts diethanol amine, and the mixture is heated to 150° C. for three hours. A colorless waxy product is obtained which solidifies at 20° C. and is clearly soluble in dilute acetic acid.

The stearoyl ethylene imide may be replaced with a similar result, for instance, by oleic acid ethylene imide or palm kernel fatty acid ethylene imide.

*Example 25*

To a solution of 20 parts polymerized ethylene imine in 50 parts chloroform there is added a solution of 20 parts benzene sulfonic acid propylene imide in 50 parts chloroform, and the mixture is refluxed for some hours. Thereupon the solvent is distilled off and the viscous oily residue is warmed to 100° C. for 5 hours while stirring. The reaction product is a light-brown mass which is tough in the cold, insoluble in water, but easily soluble in caustic alkalies and acids.

*Example 26*

20 parts benzene sulfonic acid propylene imide are warmed in an autoclave with 15 parts n-butyl amine in the water bath to 80° C. for 46 hours. A clear light brown melt is obtained from which unreacted butyl amine is distilled off in vacuo.

The viscous residue is dissolved in 8% cold caustic soda lye and unreacted benzene sulfonic acid propylene imide is removed by extraction or filtration. By adding sodium bicarbonate to the alkaline solution, the reaction product of the probable formula

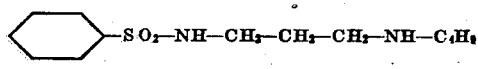

is precipitated. It represents a viscous oil which is soluble in dilute alkalies and mineral acids. The yield is about 60% of the theoretical.

Example 27

39.4 parts benzene sulfonic acid propylene imide (melting point: 66–67° C.) are heated with 18.6 parts freshly distilled aniline to 110–120° C. for 120 hours, while excluding the access of air. The viscous oil is then for the most part soluble in 5% cold caustic soda lye. For further purification, a small part of the unreacted aniline is distilled off with water vapor; the viscous oil is dissolved in an excess 5% caustic soda lye, the solution is shaken with benzene and is thereupon mixed with sodium bicarbonate, whereby the condensation product of the probable formula

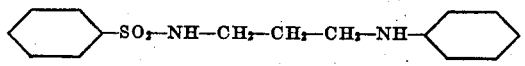

is set free. It is isolated in the usual manner. It represents a nearly colorless, thick oil which, on standing, solidifies to a crystalline mass having a melting point of 80–81° C. It is clearly soluble in dilute caustic soda lye and in dilute hydrochloric acid. The latter solution takes up nitrite and yields a yellow oily nitroso compound therewith. The yield is about 75% of the theoretical.

We claim:

1. A process for preparing acylated amines which comprises causing an amine containing at least one nitrogen atom having at least one hydrogen atom attached thereto, to react with an imide of an organic acid selected from the group consisting of carboxylic acid and sulfonic acid ethylene imides and propylene imides.

2. A process for preparing acylated amines which comprises causing an amine containing at least one nitrogen atom having at least one hydrogen atom attached thereto, to react with a carboxylic acid ethylene imide.

3. A process for preparing acylated amines which comprises causing an amine containing at least one nitrogen atom having at least one hydrogen atom attached thereto, to react with a sulfonic acid ethylene imide.

4. A process for preparing acylated amines which comprises causing an amine containing at least one nitrogen atom having at least one hydrogen atom attached thereto, to react with a sulfonic acid propylene imide.

JOHANNES NELLES.
ERNST TIETZE.
OTTO BAYER.